(12) United States Patent
Shindo

(10) Patent No.: US 6,574,692 B1
(45) Date of Patent: Jun. 3, 2003

(54) APPARATUS AND METHOD OF DATA PROCESSING THROUGH SERIAL BUS

(75) Inventor: Tomoyuki Shindo, Yamato (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/536,453

(22) Filed: Mar. 28, 2000

(30) Foreign Application Priority Data

Apr. 30, 1999 (JP) ............................................ 11-123757

(51) Int. Cl.[7] ........................ G06E 13/372; H04N 7/52
(52) U.S. Cl. ........................................ 710/124; 386/96
(58) Field of Search ....................... 341/61, 67; 386/95, 386/96; 710/124

(56) References Cited

U.S. PATENT DOCUMENTS

| | | | | |
|---|---|---|---|---|
| 5,504,757 A | | 4/1996 | Cook et al. ................... 370/84 |
| 5,715,352 A | * | 2/1998 | Han ............................. 386/95 |
| 5,784,011 A | * | 7/1998 | Malladi et al. ................ 341/67 |
| 6,204,780 B1 | * | 3/2001 | Cole ............................. 341/67 |
| 6,278,387 B1 | * | 8/2001 | Rayskiy ....................... 341/61 |
| 6,286,071 B1 | * | 9/2001 | Iijima .......................... 710/124 |
| 6,292,625 B1 | * | 9/2001 | Gotoh et al. .................. 386/95 |

FOREIGN PATENT DOCUMENTS

| | | |
|---|---|---|
| EP | 0645930 A1 | 3/1995 |
| EP | 0759614 A2 | 2/1997 |

* cited by examiner

*Primary Examiner*—Trong Phan
(74) *Attorney, Agent, or Firm*—Jacobson Holman PLLC

(57) ABSTRACT

Data is received which is transmitted through a serial bus in a predetermined transmission band. The serial bus is preferably in conformity with the IEEE 1394 standards. One of recording modes for different recording rates is selected in accordance with the transmission band of the received data. The data is recorded in the selected recording mode. Data is reproduced which has been recorded in a recording mode for a predetermined recording rate. A transmission band is allocated, based on the recording mode, for transmitting the data through a serial bus.

9 Claims, 1 Drawing Sheet

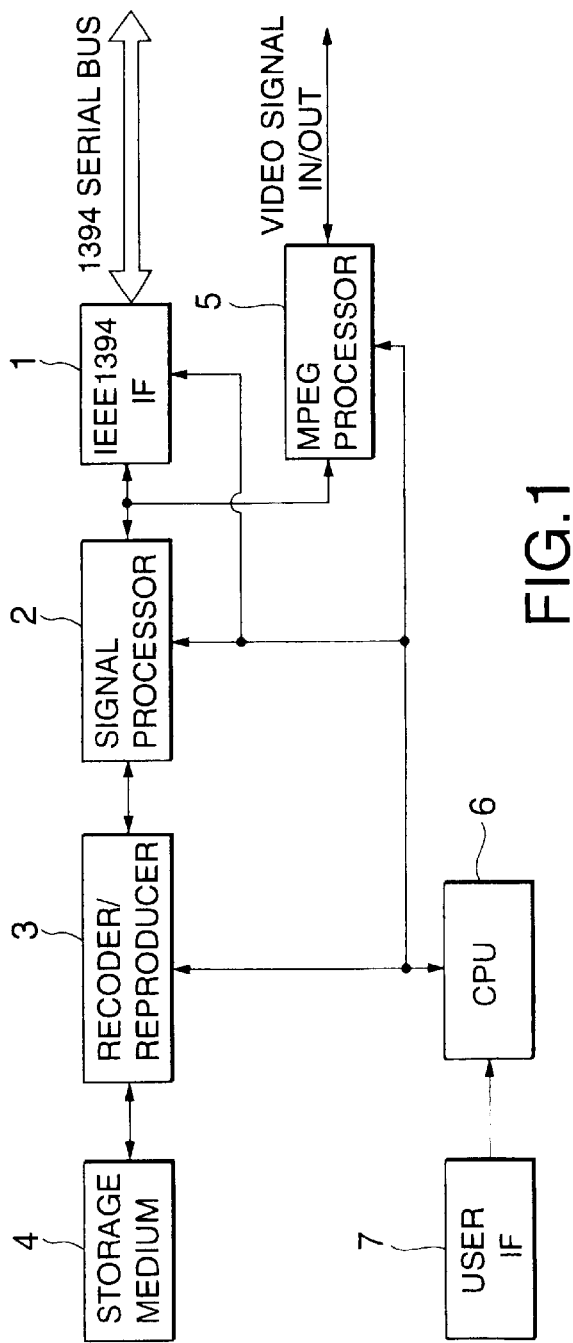
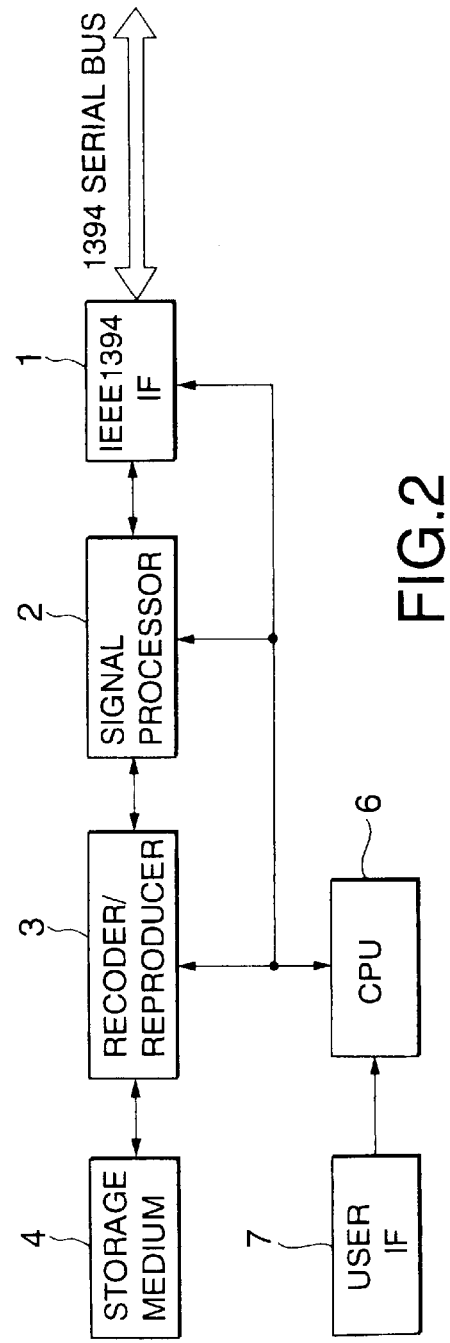

APPARATUS AND METHOD OF DATA PROCESSING THROUGH SERIAL BUS

BACKGROUND OF THE INVENTION

The present invention relates to processing of data that is received or to be transmitted through a serial bus. Particularly, this invention relates to recording and reproducing data that is input through a serial bus, and also outputting the video data through the same bus in conformity with the IEEE (Institute of Electrical and Electronics Engineers) 1394 standards. This serial bus is called 1394 serial bus hereinafter.

Video tape recorders (VTRs) are well known audio and video equipment that encode video signals under the DV (Digital Video) standards defined in the IEC (International Electrotechnical Commission) 61883 standards, and outputs the encoded video signals through the 1394 serial bus.

The DV standards define the SD (Standard Definition) mode and HD (High Definition) mode. The SD mode offers recording and reproduction of video signals having definition, such as, NTSC (National Television System Committee) video signals. The HD mode offers recording and reproduction of video signals, such as, high vision signals. However, in the DV standards, VTRs for the SD mode only have been on the market.

The encoding processing under the DV standards limits the amount of encoded vide signals per frame within a predetermined amount. The SD mode thus defines the fixed recording rate that is 25 Mbps for recording the encoded video signals on a magnetic tape.

The encoded video signals are output through the 1394 serial bus per packet under the DV standards after the transmission band is allocated in accordance with the recording rate for recording the encoded signals. In detail, the IEC 61883 standards define the plug control to store information needed for the transmission band into addresses that are accessible through the 1394 serial bus. The transmission band is then allocated using the information.

The amount of video signals varies when processed by VTRs at different data rates, and hence several transmission bands are also required on the 1394 serial bus in accordance with the different data rates.

For example, the packet size for an MPEG (Moving Picture Coding Experts Group) transport stream through the 1394 serial bus varies according to the data rates. This transport stream is called MPEG2TS hereinafter.

The wider the transmission band is allocated for the MPEG2TS, the more unnecessary bus resources are used. On the other hand, the narrower the transmission band, the more unstable is the data transmission due to violation of the communication protocols.

Furthermore, a user has to set the data recording mode for each input MPEG2TS, which is a cumbersome operation.

SUMMARY OF THE INVENTION

A purpose of the present invention is to provide an apparatus and a method of processing data that is received or to be transmitted through a serial bus, that achieve effective usage of bus resources.

Another purpose of the present invention is to provide an apparatus and a method of recording and reproduction of data that is received or to be transmitted through a serial bus, that achieve effective usage of bus resources with no user recording mode setting.

The present invention provides a signal processing apparatus having: a processor to encode an input signal at a predetermined data rate to generate encoded data; and a digital interface to allocate a transmission band for the encoded data based on the data rate for transmitting the encoded data through a serial bus.

Furthermore, the present invention provides a signal processing apparatus having: a digital interface to detect a transmission band of data input through a serial bus; and a processor to decode the input data based on the transmission band for outputting a decoded signal.

Moreover, the present invention provides a recording and reproducing apparatus having: a digital interface to transmit or receive data through a serial bus, the interface allocating a transmission band before data transmission; a recording and reproducing section to record and reproduce the data at least in one of a plurality of recording modes for different recording rates; and a controller to control the interface for changing the allocated transmission band in accordance with the recording mode for the data reproduced by the recording and reproducing section.

The present invention also provides a recording and reproducing apparatus having: a digital interface to transmit or receive data through a serial bus in a predetermined transmission band; a recording and reproducing section to record and reproduce the data at least in one of a plurality of recording modes for different recording rates; and a controller to control the recording and reproducing section for selecting one of the recording modes in accordance with the transmission band of the data received by the interface.

The present invention further provides a method of signal processing. An input signal is encoded at a predetermined data rate to generate encoded data. A transmission band is allocated for the encoded data based on the data rate for transmitting the encoded data through a serial bus.

Moreover, the present invention further provides a method of signal processing. A transmission band of data input through a serial bus is detected. The input data is decoded based on the transmission band for outputting a decoded signal.

The present invention also provides a method of data processing. Data is reproduced which has been recorded in a recording mode for a predetermined recording rate. A transmission band is allocated, based on the recording mode, for transmitting the data through a serial bus.

Furthermore, the present invention provides a method of data processing. Data is received which has been transmitted through a serial bus in a predetermined transmission band. One of a plurality of predetermined recording modes for different recording rates is selected in accordance with the transmission band of the received data. The data is recorded in the selected recording mode.

BRIEF DESCRIPTION OF DRAWINGS

FIG. 1 shows a block diagram of a recording and reproducing apparatus according to the present invention; and FIG. 2 shows a block diagram of a modification of a recording and reproducing apparatus according to the present invention.

DETAILED DESCRIPTION OF PREFERRED EMBODIMENTS

Preferred embodiments according to the present invention will be disclosed with reference to the attached drawings.

FIG. 1 shows a block diagram of a recording and reproducing apparatus according to the present invention.

An MPEG2TS is input to or output from an IEEE1394 interface (IF) 1 through a 1394 serial bus.

The input MPEG2TS is supplied to a signal processor 2 for error correction, etc. The output of the signal processor 2 is supplied to a recorder/reproducer 3 for modulation. The modulated MPEG2TS is stored in a storage medium 4.

The stored MPEG2TS is then retrieved and demodulated by the recorder/reproducer 3, and applied error correction, etc., by the signal processor 2. The MPEG2TS is supplied to and output from the IEEE1394IF 1 through the 1394 serial bus. Or, the MPEG2TS is supplied to an MPEG processor 5 and decoded to be an output video signal.

On the other hand, an input video signal is encoded by the MPEG processor 5, and then stored in the storage medium 4 through the signal processor 2 and the recorder/reproducer 3, or output from the IEEE1394IF 1 to the 1394 serial bus.

The recording and reproducing apparatus shown in FIG. 1 is further provided with a CPU 6 that communicates with the IEEE1394IF 1, the signal processor 2, the recorder/reproducer 3 and the MPEG processor 5 for changing the data rate of the signal processed by these circuitry. A user can enter several commands to the CPU 6 via a user interface (IF) 7.

The recording and reproducing apparatus according to the present invention is offered several recording modes for different data recording rates.

In detail, the recording rate for recording (storing) the signal in the storage medium 4 is set in accordance with the transmission band of an MPEG2TS supplied by the IEEE1394IF 1. Or, the transmission band of an MPEG2TS output by the IEEE1394IF 1 to the 1394 serial bus is allocated in accordance with the data rate of the signal reproduced from the storage medium 4.

Disclosed in detail first is recording (storing) a video signal in the storage medium 4, which is input via the IEEE1394IF 1 or the MPEG processor 5.

The user selects one recording mode among several modes for recording a video signal that is input via the MPEG processor 5. The recording modes are the first mode for the lowest recording rate B1, the second mode for the intermediate recording rate B2, and the third mode for the highest recording rate B3.

When the user selects, for example, the second recording mode, a mode selection request is entered to the CPU 6 via the user IF 7. The CPU 6 sends a control signal to the signal processor 2, the recorder/reproducer 3 and the MPEG processor 5 for recording at the data rate B2. The control signal is also sent to the IEEE1394IF 1 for data output at the data rate B2.

The recording processing in the second mode is executed as follows:

An input video signal supplied to the MPEG processor 5 is transformed into an MPEG2TS having a data rate that does not exceed the recording rate B2. The MPEG2TS is supplied to the signal processor 2 and applied addition of headers and error correction codes, and shuffling for making the data amount uniform for data blocks, etc., and supplied to the recorder/reproducer 3. The processed MPEG2TS is then modulated in the recorder/reproducer 3 and stored in the storage medium 4.

Furthermore, the CPU 6 allocates a transmission band (transmission rate R2) for outputting the MPEG2TS having the recording rate B2 from the MPEG processor 5 to the 1394 serial bus via the IEEE1394IF 1.

The data rate of the MPEG2TS output from the MPEG processor 5 is controlled so as not to exceed the recording rate B2. The MPEG2TS is then output from IEEE1394IF 1 in the transmission band that is allocated not based on the data rate of the video signal input to the MPEG processor 5 but the control signal sent by the CPU 6.

When the user selects an MPEG2TS input via the IEEE1394IF 1 for recording, the CPU 6 sends a control signal to the IEEE1394IF 1 for communication with an external apparatus (not shown) that has transmitted the MPEG2TS through the 1394 serial bus. The IEEE1394IF 1 calculates the transmission band allocated to the MPEG2TS based on the information required for allocating transmission band and stored in a register called OPCR (Output Plug Control Resister defined by the IEC 61883 standards). The recording mode is also selected based on the information.

Suppose that the first recording mode is selected.

An MPEG2TS input through the 1394 serial bus is supplied to the signal processor 2 via the IEEE1394IF 1 for addition of headers and error correction codes and shuffling.

The output of the signal processor 2 is supplied to the recorder/reproducer 3 for modulation. The modulated MPEG2TS is stored in the storage medium 4 in the first recording mode.

The input MPEG2TS is also supplied to the MPEG processor 5 via the IEEE1394IF 1. The MPEG2TS is decoded under the control signal from the CPU 6, and output as a video signal.

Disclosed next is reproduction of an encoded video signal stored in the storage medium 4.

Suppose that the encoded video signal (MPEG2TS) has been stored in the storage medium 4 in the third recording mode.

The signal is retrieved and supplied to the recorder/reproducer 3 for demodulation. The recorder/reproducer 3 then sends information indicating the third recording mode to the CPU 6.

In response to the information, the CPU 6 sends a control signal to the signal processor 2 for error correction, etc., and to the IEEE1394IF 1 for allocation of a transmission band to transmit the MPEG2TS that has been recorded (stored) at the recording rate B3, through the 1394 serial bus.

The control signal is also sent to the MPEG processor 5 for decoding and outputting a video signal.

The data rate of the video signal retrieved from the storage medium 4 never exceeds the recording rate B3. The transmission band for transmitting an MPEG2TS via the IEEE1394IF 1 is allocated based on the control signal from the CPU 6, not the data rate of the MPEG2TS output by the signal processor 2.

Disclosed next is encoding an input video signal into an MPEG2TS which is to be output via the IEEE1394IF1 without recording and reproduction.

Suppose that the user selects the second recording mode (recording rate B2) via the user IF 7.

The CPU 6 sends a control signal to the MPEG processor 5 for encoding an input video signal at a data rate below the recording rate B2.

The output of the MPEG processor 5 is supplied to the IEEE1394IF 1 for allocating a transmission band based on the control signal from the CPU 6. An MPEG2TS is then output by the IEEE1394IF 1 to the 1394 serial bus in the allocated transmission band.

Disclosed next is decoding an input MPEG2TS into a video signal which is to be output via the MPEG processor 5, without recording and reproduction.

The CPU 6 sends a control signal to the IEEE1394IF 1 to communicate with an external apparatus (not shown) that has transmitted an MPEG2TS through the 1394 serial bus. The IEEE1394IF 1 calculates the transmission band allocated to the MPEG2TS.

The MPEG2TS is supplied to the MPEG processor 5 and decoded into a video signal to be output based on the calculated transmission band.

As disclosed above, a transmission band is allocated in accordance with a recording mode for transmitting an MPEG2TS through the 1394 serial bus.

This transmission band allocation achieves continuous transmission of signals retrieved from a storage medium for, for instance, a plurality of video programs having different data rates stored therein with no requirement of the reallocation of transmission band in accordance with the different data rates, when the programs have been stored in the same recording mode.

The same achievement goes to one video program for which the data rate varies with no requirement of reallocation of transmission band in accordance with the varying data rate, when the program has been stored in the same recording mode from the beginning to end.

Moreover, this transmission band allocation requires no addition of data rates of a plurality of video programs stored in a storage medium as one MPEG2TS, for transmission of the programs simultaneously through the 1394 serial bus.

Not only that, quick reallocation of transmission band is achieved for recording mode that is varying during retrieval from a storage medium.

Change in recording mode from high to low recording rate does not affect continuous data transmission even during transmission band adjustment.

Furthermore, the quick allocation of transmission band overcomes the problem in that change in recording mode from low to high recording rate would force intermittent data transmission.

Recording of an MPEG2TS input through the 1394 serial bus in this invention offers recording mode selection in accordance with payload size of an MPEG2TS input through the 1394 serial bus. The recording mode is thus automatically selected that fits the transmission band of the input MPEG2TS with no requirement of user mode setting. This mode selection achieves effective data recording in a storage medium.

The signal (or data) described so far is a video signal. It is, however, understood that an audio signal can also be transmitted or received via the IEEE1394IF 1, with a video signal.

The recording and reproducing apparatus of FIG. 1 includes the MPEG processor 5. It can, however be omitted as shown in FIG. 2.

The communications between the CPU 6 and the IEEE1394IF 1, the signal processor 2, the recorder/reproducer 3 and the MPEG processor 5 are achieved by control programs stored on the CPU 6. The software is programmed in accordance with the specification of each circuitry, which is understandable for ordinary skilled persons in the art; and hence not disclosed for brevity.

As disclosed above, according to the present invention, data retrieved from a storage medium is output to the 1394 serial bus via the IEEE1394 interface in a transmission band that is allocated in accordance with the recording mode for the MPEG2TS when recorded. The transmission band allocation achieves data transmission with effective usage of bus resources.

Furthermore, according to the present invention, the recording rate is set in accordance with the transmission band of data input via the IEEE1394 interface. The recording rate setting achieves effective data recording with no user recording mode setting.

What is claimed is:

1. A recording and reproducing apparatus comprising:
    a recording and reproducing section to record data in a storage medium in a recording mode selected among a plurality of recording modes for different recording rates and reproduce the data from the storage medium;
    a digital interface connected to external equipment through a serial bus, to allocate a transmission band before data transmission and then transmit the reproduced data to the external equipment through the serial bus in the allocated transmission band; and
    a controller to control the recording and reproducing section for data recording and reproduction and the digital interface for data communication,
    wherein when reproducing the data from the storage medium and transmitting the reproduced data to the external equipment,
    the recording and reproducing section reproduces the data recorded in the storage medium in the recording mode selected among the recording modes,
    the controller controls the digital interface so that the digital interface can allocate the transmission band corresponding to the selected recording mode, and
    the digital interface transmits the reproduced data to the external equipment in the allocated transmission band.

2. The apparatus according to claim 1, wherein the serial bus is in conformity with the IEEE (Institute of Electrical and Electronics Engineers) standards.

3. A recording and reproducing apparatus comprising:
    a digital interface connected to external equipment through a serial bus, to receive data transmitted from the external equipment through the serial bus;
    a recording and reproducing section to record data in a storage medium in a recording mode selected among a plurality of recording modes for different recording rates and reproduce the data from the storage medium; and
    a controller to control the recording and reproducing section for data recording and reproduction and the digital interface for data communication,
    wherein when recording the data transmitted via the digital interface in the storage medium,
    the digital interface gains the transmission band allocated for the transmission of the data via the digital interface, and
    the controller controls the recording and reproducing section so that the recording and reproducing section can record the data transmitted via the digital interface in a recording mode corresponding to the transmission band gained by the digital interface, and
    the recording and reproducing section to record data in a storage medium in the recording mode.

4. The apparatus according to claim 3, wherein the serial bus is in conformity with the IEEE (Institute of Electrical and Electronics Engineers) standards.

5. A recording and reproducing apparatus comprising:
    a recording and reproducing section to record data in a storage medium in a recording mode selected among a plurality of recording modes for different recording rates and reproduce the data from the storage medium;

a digital interface connected to external equipment through a serial bus, to allocate a transmission band before data transmission and then transmit the data reproduced from the storage medium to the external equipment via the serial bus and receive data transmitted from the external equipment through the serial bus;

a controller to control the recording and reproducing section for data recording and reproduction and the digital interface for data communication, wherein when reproducing data from the storage medium and outputting the reproduced data to the external equipment, the recording and reproducing section reproduces the data recorded in the storage medium in a recording mode selected among the recording modes, the controller controls the digital interface so that the digital interface can allocate the transmission band corresponding to the selected recording mode, and the digital interface transmits the reproduced data to the external equipment in the allocated transmission band, whereas when recording the data transmitted via the digital interface in the storage medium, the digital interface gains the transmission band allocated for the transmission of the data via the digital interface, and the controller controls the recording and reproducing section so that the recording and reproducing section can record the data transmitted via the digital interface in the recording mode corresponding to the transmission band gained by the digital interface, and the recording and reproducing section records the data transmitted via the digital interface in the storage medium in the selected recording mode.

6. The apparatus according to claim 5, wherein the serial bus is in conformity with the IEEE (Institute of Electrical and Electronics Engineers) standards.

7. A recording and reproducing method comprising the steps of:

recording data in a storage medium in a recording mode selected among a plurality of recording modes for different recording rates and reproducing the data from the storage medium;

allocating a transmission band before data transmission;

transmitting the reproduced data through a serial bus in the allocated transmission band; and controlling data recording and reproduction to and from the storage medium and data transmission, wherein when reproducing the data from the storage medium and transmitting the reproduced data through the serial bus, reproducing the data recorded in the storage medium in the recording mode selected among the recording modes, allocating the transmission band corresponding to the selected recording mode, and transmitting the reproduced data through the serial bus in the allocated transmission band.

8. A recording and reproducing method comprising the steps of:

receiving data through a serial bus;

recording the data in a storage medium in a recording mode selected among a plurality of recording modes for different recording rates and reproducing the data from the storage medium; and controlling data recording and reproduction to and from the storage medium and at a transmission band, wherein when recording the data transmitted via the serial bus in the storage medium, gaining the transmission band allocated for the transmission of the data, selecting one of the recording modes corresponding to the gained transmission band, and recording the data in the storage medium in the selected recording mode.

9. A recording and reproducing method comprising the steps of:

recording data in a storage medium in a recording mode selected among a plurality of recording modes for different recording rates and reproducing the data from the storage medium;

allocating a transmission band before transmitting data via a serial bus and receiving data transmitted via the serial bus; and controlling data recording and reproduction to and from the storage medium and data transmission;

wherein when reproducing the data from the storage medium and outputting the reproduced data to the serial bus, reproducing the data recorded in the storage medium in a recording mode selected among the recording modes, allocating the transmission band corresponding to the selected recording mode, and transmitting the reproduced data to the serial bus in the allocated transmission band, whereas when recording the data transmitted via the serial bus in the storage medium, gaining the transmission band allocated for the transmission of the data, and selecting one of the recording mode corresponding to the gained transmission band, and recording the data in the storage medium in the selected recording mode.

* * * * *